W. SCHICK.
MACHINE FOR GATHERING FALLEN OUT SEEDS OF CLOVER AND OTHER CEREALS.
APPLICATION FILED MAR. 28, 1910.
1,004,915.
Patented Oct. 3, 1911.
2 SHEETS—SHEET 1.
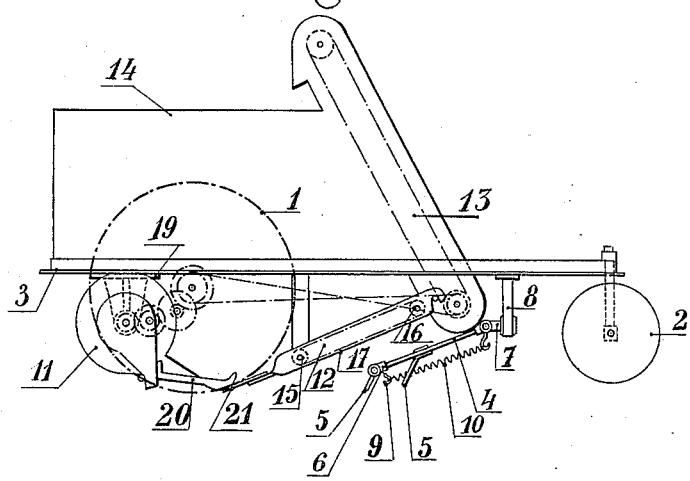
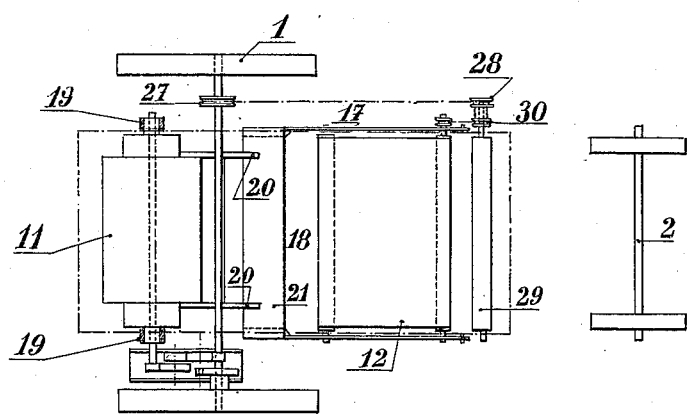

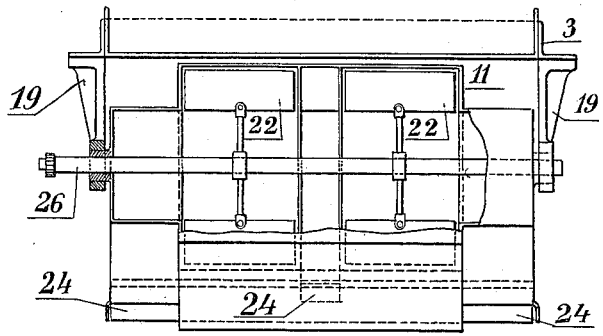
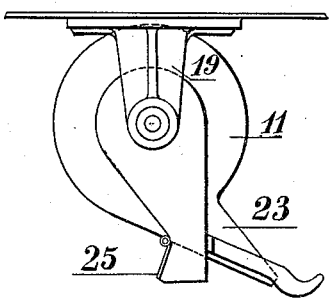
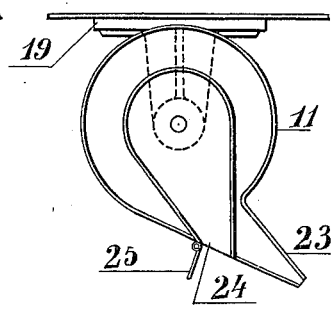
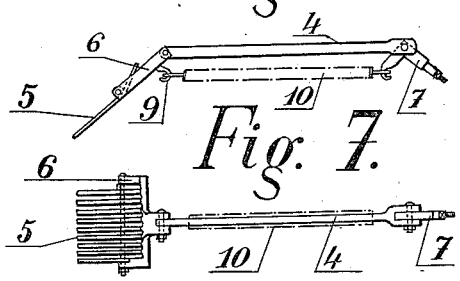

UNITED STATES PATENT OFFICE.

WILHELM SCHICK, OF VEREBÉLY, AUSTRIA-HUNGARY.

MACHINE FOR GATHERING FALLEN-OUT SEEDS OF CLOVER AND OTHER CEREALS.

1,004,915. Specification of Letters Patent. Patented Oct. 3, 1911.

Application filed March 28, 1910. Serial No. 551,998.

*To all whom it may concern:*

Be it known that I, WILHELM SCHICK, a subject of the King of Hungary, Emperor of Austria-Hungary, residing at Verebély, Austria-Hungary, have invented certain new and useful Improvements in Machines for Gathering Fallen-Out Seeds of Clover and other Cereals, of which the following is a specification.

This invention relates to a machine for gathering fallen out seeds of clover or other cereals.

The machine is shown in the accompanying drawings.

Figure 1 is a side elevation. Fig. 2 is a plan view of the machine without the end frame and the raking device; the receptacle and elevator being shown only in dotted lines. Fig. 3 represents the fan in longitudinal section. Figs. 4 and 5 are respectively a side elevation and cross section of the fan. Figs. 6 and 7 represent in side elevation and plan view respectively the raking device.

The improved machine is constructed as follows:—The underframe 3 is mounted upon the axles of the wheels 1, 2, and carries the several parts of the mechanism. At the front end of the underframe 3 the ground raking device is hinged which consists of a rod 4 to the rear end of which frames 6 are hinged between which two sets of teeth 5 are fixed destined to break up the ground. The forkshaped front end of said rod 4 is hinged to a knee bracket 7 fixed with its other end to a bracket 8 of the underframe. The upper end of knee bracket 7 is threaded and adjustably fixed in the bracket 8 by means of a nut. The lower end of said knee bracket 7 is hookshaped. A tension spring 10 which is hooked with one end on said kneelever 7 is hooked with its other end to hooks 9 fixed in the lower surface of the frames 6 so that said frames are securely held in proper position. This device serves for raking the ground and loosening the seeds to be gathered.

A fan 11 is fixed on the lower surface of the under frame so that it extends over the entire width of the machine and designed to suck the loosened seeds into its casing so that they fall upon a conveyer band 12. This conveyer 12 consists of an endless band guided over two drums 15, 16 and between two guide plates 17 hinged to the lower end of the receptacle 14 and supported by any convenient part of the machine. The casing 11 of the fan is movably mounted in brackets 19 fixed to the under frame of the machine. The front end 23 of said casing 11 has a shoe 20 which bears upon the cross plate 21 so that the fan can yield.

The fan consists of two series of wings 22 revolubly mounted on a common shaft 26 and designed to produce first a strong air current blowing through the orifice 23 against the earth so that the seeds which have previously been loosened by the rakes 5 are blown over the cross plate 21 upon the conveyer 12. The casing 11 further has at both ends and at the middle openings 24 behind which a baffle plate 25 is arranged which directs the seeds into said openings. The seeds which are thus collected upon the conveyer band are conducted by means of the elevator 13 into the receptacle 14 mounted upon the under frame of the machine.

The device is operated from the axle of the wheels 1 by means of rope pulley 27 connected through a rope with the rope pulley 28 which drives the elevator 13, a rope pulley 30 keyed upon the lower shaft 29 of said elevator being connected with the guide drums 16 of the conveyer band 12. The shaft 26 for the fan is directly driven from the axle of wheels 1 by means of a toothed gearing.

I claim:—

An improved machine for gathering fallen-out seeds of clover or other cereals comprising in combination with the under frame of the machine, wheels on which said under frame is mounted, a device for loosening the seeds arranged under the front end of said under frame, brackets fixed at the rear end of said under frame, a fan movably mounted in said brackets and having inlet openings in the bottom of its casing, means for revolving the shaft of said fan, a blow pipe at the front end of said fan for conducting the air current so that the seeds which have been raked up are blown into the machine, a baffle plate in the rear of said blow pipe, a conveyer in front of said fan, an elevator in front of the front end of said conveyer and a seed collector upon said under frame, and means for driving the elevator from the wheel axle and the conveyer from the elevator, substantially as described and shown and for the purpose set forth.

In witness whereof I have hereunto set my hand in the presence of two witnesses.

WILHELM SCHICK.

Witnesses:
    FRIEDRICH BLUM,
    HUGH KEMEING.

---

Copies of this patent may be obtained for five cents each, by addressing the "Commissioner of Patents, Washington, D. C."